(12) United States Patent
Street et al.

(10) Patent No.: US 11,069,019 B2
(45) Date of Patent: Jul. 20, 2021

(54) MULTI-THREADED ASYNCHRONOUS FRAME PROCESSING

(71) Applicant: Facebook, Inc., Menlo Park, CA (US)

(72) Inventors: Andrew Lankes Street, Midlothian, VA (US); Jordan Christopher Walke, Saratoga, CA (US); Ashwin Ravindra Bharambe, Sunnyvale, CA (US); Lin He, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 312 days.

(21) Appl. No.: 15/587,341

(22) Filed: May 4, 2017

(65) Prior Publication Data

US 2018/0322605 A1 Nov. 8, 2018

(51) Int. Cl.
  *G06F 9/38* (2018.01)
  *G06T 1/20* (2006.01)
  *G06F 9/30* (2018.01)
  *G06F 9/48* (2006.01)

(52) U.S. Cl.
  CPC .............. *G06T 1/20* (2013.01); *G06F 9/3009* (2013.01); *G06F 9/3885* (2013.01); *G06F 9/4881* (2013.01)

(58) Field of Classification Search
  CPC .................................................... G06F 9/3851
  See application file for complete search history.

(56) References Cited

U.S. PATENT DOCUMENTS

| 9,477,649 B1 | 10/2016 | Davidson et al. |
| 2006/0033743 A1 | 2/2006 | Morein et al. |
| 2009/0100164 A1* | 4/2009 | Skvortsov ............... G06F 9/485 709/223 |
| 2009/0116732 A1 | 5/2009 | Zhou et al. |
| 2013/0055072 A1* | 2/2013 | Arnold .................. G06T 15/005 715/240 |
| 2014/0139512 A1 | 5/2014 | Piazza et al. |
| 2015/0193959 A1* | 7/2015 | Shah .......................... G06F 3/00 345/473 |
| 2015/0339006 A1* | 11/2015 | Chaland ............... G06F 3/0482 715/835 |

(Continued)

OTHER PUBLICATIONS

Advisory Action dated Oct. 5, 2017 for U.S. Appl. No. 15/012,666 by Street, A., filed Feb. 1, 2016.

(Continued)

*Primary Examiner* — Jacob Petranek
(74) *Attorney, Agent, or Firm* — FisherBroyles, LLP

(57) ABSTRACT

Parallel processing of frames by a first and second thread is disclosed. In particular, the systems and methods can process multiple frames in a pipelines manner by a JavaScript thread and a UI thread. The system first executes a first frame by a JavaScript thread during a first time interval. The system then executes the first frame by a UI thread during a second time interval. While the UI thread is executing the first frame, the JavaScript thread executes a second thread in parallel during the second time internal. As a result, latency is added to UI processing while maintaining the same throughput, to add parallelism. The JavaScript and UI threads can be handled by different processors (e.g., using a multi-core processor), thereby adding further parallelism and increasing the efficiency of processing an event.

20 Claims, 4 Drawing Sheets

(56) References Cited

U.S. PATENT DOCUMENTS

| | | | |
|---|---|---|---|
| 2015/0370568 A1* | 12/2015 | Robertson ........... | G06F 9/30189 |
| | | | 712/43 |
| 2016/0085583 A1* | 3/2016 | Goodson ............... | G06F 9/4881 |
| | | | 718/108 |
| 2016/0162171 A1* | 6/2016 | Yi ......................... | G06F 9/5044 |
| | | | 715/211 |
| 2016/0306611 A1* | 10/2016 | Young ...................... | G06F 9/54 |
| 2017/0221242 A1 | 8/2017 | Street | |
| 2018/0329742 A1* | 11/2018 | Lo ......................... | G06F 9/4887 |

OTHER PUBLICATIONS

Final Office Action dated Jul. 27, 2017, for U.S. Appl. No. 15/012,666 by Street, A., filed Feb. 1, 2016.
Non-Final Office Action dated Feb. 9, 2017, for U.S. Appl. No. 15/012,666 by Street, A., filed Feb. 1, 2016.
U.S. Appl. No. 15/012,666, by Street, A., et al., filed Feb. 1, 2016.
U.S. Appl. No. 15/200,445 by Street, A., et al., filed Jul. 1, 2016.
U.S. Appl. No. 15/585,071 by Street, A., et al., filed May 2, 2017.
Non-Final Office Action dated Nov. 16, 2017 for U.S. Appl. No. 15/012,666 by Street, A., filed Feb. 1, 2016.

* cited by examiner

MULTI-THREADED ASYNCHRONOUS FRAME PROCESSING

BACKGROUND

Web pages displayed at a user's device are expected to offer smooth interaction with minimal delay in rendering. That is, web pages should not only load quickly, but also run well. Further, a user should be able to scroll a web page without experiencing jitters to breaks in viewing experience. Most devices today refresh their screens 60 times a second. If the web page being displayed contains an animation or a transition, or the user is scrolling the pages, the browser needs to match the device's refresh rate and put up 1 new picture, or frame, for each of those screen refreshes. Thus, each frame has a budget of about 16 ms (1 second/60=16.67 ms). When a user's device fails to meet this budget, the frame rate drops, and the content judders on screen. This is often referred to as jank, and it negatively impacts the user's experience.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Overview

Figure 1:
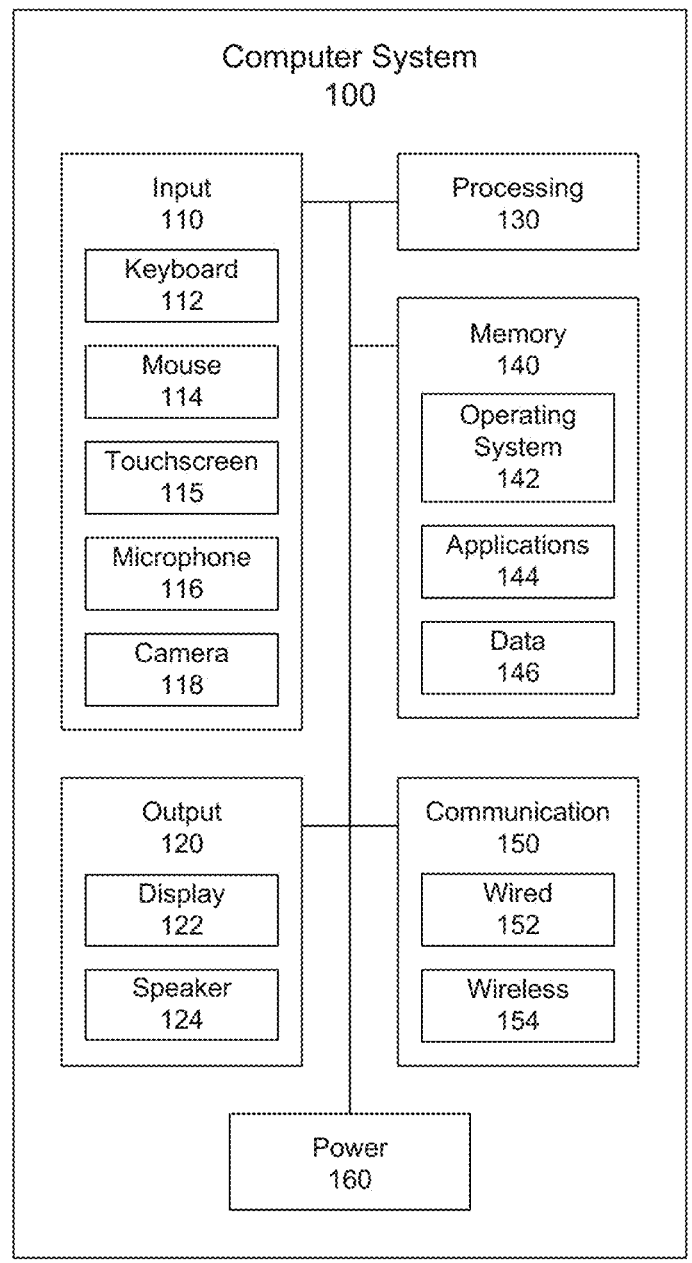
FIG. 1 is a block diagram showing some of the components typically incorporated in computer systems and other devices on which an asynchronous UI framework can be implemented.

When an application component starts on a device, the operating system typically starts a new process for the application with a single thread of execution. All components of the same application can run in the same process and thread (called the "main" thread). The main thread is in charge of dispatching events to the appropriate user interface widgets, including drawing events. The main thread is also called the UI thread. All components that run in the same process are typically instantiated in the UI thread, and system calls to each component are dispatched from that thread. As a result, methods that respond to system callbacks (e.g., methods to report user actions or a lifecycle callback method) always run in the UI thread of the process. For example, when the user touches a button on the screen, the application's UI thread dispatches the touch event to the widget, which in turn sets its pressed state and posts a request to the event queue. The UI thread de-queues the request and notifies the widget that it should redraw itself. When an application performs intensive work in response to user interaction, a single thread model can yield poor performance. For example, if everything is happening in the UI thread, performing long operations such as network access or database queries will block the whole UI. When the thread is blocked, no events can be dispatched, including drawing events. From the user's perspective, the application appears to hang. If the UI thread is blocked for more than a few seconds (e.g., 5 seconds), the user is presented with an "application not responding" dialog. The user might then decide to quit the application and even uninstall it if they are dissatisfied with the performance. The disclosure is directed to improve the responsiveness of an application's UI and improve a user's experience.

In some embodiments, different components in an application can run in separate processes and additional threads can be created for any process. For example, the applicant of the present disclosure has developed a "React Native" framework for building mobile applications. The React Native framework enables a user ("developer" or "programmer") to build mobile apps using only JavaScript. For most React Native applications, business logic runs on a JavaScript thread. The JavaScript thread handles API calls, touch events, view displays, view styles, etc. A separate UI (main) thread can be used for interfacing with the operating system and for rendering views on the user's device. UI can be manipulated exclusively on the UI thread. The JavaScript thread and the UI thread can be executed in parallel in a single frame in order to render views on the user's device. The JavaScript thread may execute during one part of the frame and then communicate with the UI thread so that the UI thread can then execute for the other part of the frame. However, this process can be inefficient because it restricts execution of complex code (e.g., several JavaScript transactions) to a very short amount of time (e.g., half a frame=8 ms). For example, if an application has to perform intensive work in response to user interaction, the JavaScript and UI threads may not be able to do the work necessary to generate the frame within the allotted 16.67 ms, resulting in a dropped frame and an unresponsive UI.

The present disclosure describes a pipelined architecture that can enable parallel processing of JavaScript and UI threads. In some implementations, processing of a JavaScript thread is handled during a first frame during a first time interval, and then processing of the UI thread is handled in a subsequent frame during a second time interval. In this way, the JavaScript and UI threads can each receive the full frame (e.g., 16.67 ms) for processing, but they are offset by the duration of a frame (or one or more time intervals). That is, latency can be added to UI processing while maintaining the same throughput, to add parallelism. In some implementations, the JavaScript and UI threads can be handled by different cores of the same processor (e.g., using a multi-core processor), thereby adding further parallelism and increasing the efficiency of processing an event.

DESCRIPTION OF FIGURES

The following description provides certain specific details of the illustrated examples. One skilled in the relevant art will understand, however, that embodiments can be practiced without many of these details. Likewise, one skilled in the relevant art will also understand that the present disclosure can include many other obvious features not described in detail herein. Additionally, some well-known structures or functions may not be shown or described in detail below, to avoid unnecessarily obscuring the relevant descriptions of the various examples.

FIG. 1 is a block diagram showing some of the components typically incorporated in computing systems and other devices on which an asynchronous UI framework can be implemented. In the illustrated embodiment, the computer system 100 includes a processing component 130 that controls operation of the computer system 100 in accordance with computer-readable instructions stored in memory 140. The processing component 130 may be any logic processing unit, such as one or more central processing units (CPUs), graphics processing units (GPUs), digital signal processors (DSPs), field-programmable gate arrays (FPGAs), application-specific integrated circuits (ASICs), etc. The processing component 130 may be a single processing unit or multiple processing units in an electronic device or distributed across multiple devices. Aspects of the system can be embodied in a special purpose computing device or data processor that is specifically programmed, configured, or constructed to perform one or more of the computer-executable instructions explained in detail herein. Aspects can also be practiced in distributed computing environments in which functions are performed by local and/or remote processing devices that are linked through a communications network, such as a local area network (LAN), wide area network (WAN), or the Internet.

The processing component 130 is connected to memory 140, which can include a combination of temporary and/or permanent storage, and both read-only memory (ROM) and writable memory (e.g., random access memory or RAM, CPU registers, and on-chip cache memories), writable non-volatile memory such as flash memory or other solid-state memory, hard drives, removable media, magnetically or optically readable discs and/or tapes, nanotechnology memory, synthetic biological memory, and so forth. A memory is not a propagating signal divorced from underlying hardware; thus, a memory and a computer-readable storage medium do not refer to a transitory propagating signal per se. The memory 140 includes data storage that contains programs, software, and information, such as an operating system 142, application programs 144, and data 146. Computer system 100 operating systems 142 can include, for example, Windows®, Linux®, Android™, iOS®, and/or an embedded real-time operating system. The application programs 144 and data 146 can include software and databases—including data structures, database records, other data tables, etc. —configured to control computer system 100 components, process information, communicate and exchange data and information with remote computers and other devices, etc. In a distributed computing environment, program modules and data can be located in both local and remote memory storage devices.

In some embodiments, the memory 140 includes program memory that contains programs and software, and data memory that includes configuration data, settings, preferences, files, documents, etc. that may be accessed by instructions from the program memory or by a component of the computing system 100. Program memory can include modules of the operating system 142 and application programs 144, such as a view management system and view rendering software for displaying and modifying views according to the present disclosure, and communication software for transmitting and receiving data by various channels and protocols via the communication components 150.

The computer system 100 can include input components 110 that receive input from user interactions and provide input to the processor 130, typically mediated by a hardware controller that interprets the raw signals received from the input device and communicates the information to the processor 130 using a known communication protocol. Examples of an input component 110 include a keyboard 112 (with physical or virtual keys), a pointing device (such as a mouse 114, joystick, dial, or eye tracking device), a touchscreen 115 that detects contact events (e.g., when it is touched by a user), a microphone 116 that receives audio input (e.g., for systems implementing speech recognition as a method of input by the user), and a camera 118 for photograph and/or video capture. The computer system 100 can also include various other input components 110 such as GPS or other location determination sensors, motion sensors, wearable input devices with accelerometers (e.g., wearable glove-type or head-mounted input devices), biometric sensors (e.g., a fingerprint sensor), light sensors (e.g., an infrared sensor), card readers (e.g., a magnetic strip reader or a memory card reader), and so on.

The processor 130 can also be connected to one or more various output components 120, e.g., directly or via a hardware controller. The output devices can include a display 122 on which text and graphics are displayed. The display 122 can be, for example, an LCD, LED, or OLED display screen (such as a desktop computer screen, handheld device screen, or television screen), an e-ink display, a projected display (such as a heads-up display device), and/or a display integrated with a touchscreen 115 that serves as an input device as well as an output device that provides graphical and textual visual feedback to the user. The output devices can also include a speaker 124 for playing audio signals, haptic feedback devices for tactile output such as vibration, etc. In some implementations, the speaker 124 and the microphone 116 are implemented by a combined audio input-output device.

In the illustrated embodiment, the computer system 100 further includes one or more communication components 150. The communication components can include, for example, a wired network connection 152 (e.g., one or more of an Ethernet port, cable modem, FireWire cable, Lightning connector, universal serial bus (USB) port, etc.) and/or a wireless transceiver 154 (e.g., one or more of a Wi-Fi transceiver; Bluetooth transceiver; near-field communication (NFC) device; wireless modem or cellular radio utilizing GSM, CDMA, 3G and/or 4G technologies; etc.). The communication components 150 are suitable for communication between the computer system 100 and other local and/or remote computing devices, directly via a wired or wireless peer-to-peer connection and/or indirectly via a communication link and networking hardware, such as switches, routers, repeaters, electrical cables and optical fibers, light emitters and receivers, radio transmitters and receivers, and the like (which can include the Internet, a public or private intranet, a local or extended Wi-Fi network, cell towers, the plain old telephone system (POTS), etc.). The computer system 100 further includes power 160, which can include battery power and/or facility power for operation of the various electrical components associated with the computer system 100.

FIG. 1 and the discussion herein provide a brief, general description of a suitable computing environment in which a system providing an asynchronous UI framework can be implemented. Although not required, aspects of the system are described in the general context of computer-executable instructions, such as routines executed by a general-purpose computer, e.g., a mobile device, a server computer, or a personal computer. Those skilled in the relevant art will appreciate that the system can be practiced using various communications, data processing, or computer system configurations, e.g., hand-held devices (including tablet computers, personal digital assistants (PDAs), and mobile phones), laptop computers, wearable computers, vehicle-based computers, multi-processor systems, microprocessorbased consumer electronics, set-top boxes, network appliances, mini-computers, mainframe computers, virtual computing platforms, distributed computing environments that include any of the above systems or devices, etc. The terms "computer" and "electronic device" are generally used interchangeably herein, and refer to any such data processing devices and systems. While computer systems configured as described above are typically used to support the operation of a system implementing an asynchronous UI framework, one of ordinary skill in the art will appreciate that embodiments may be implemented using devices of various types and configurations, and having various components.

Figure 2:
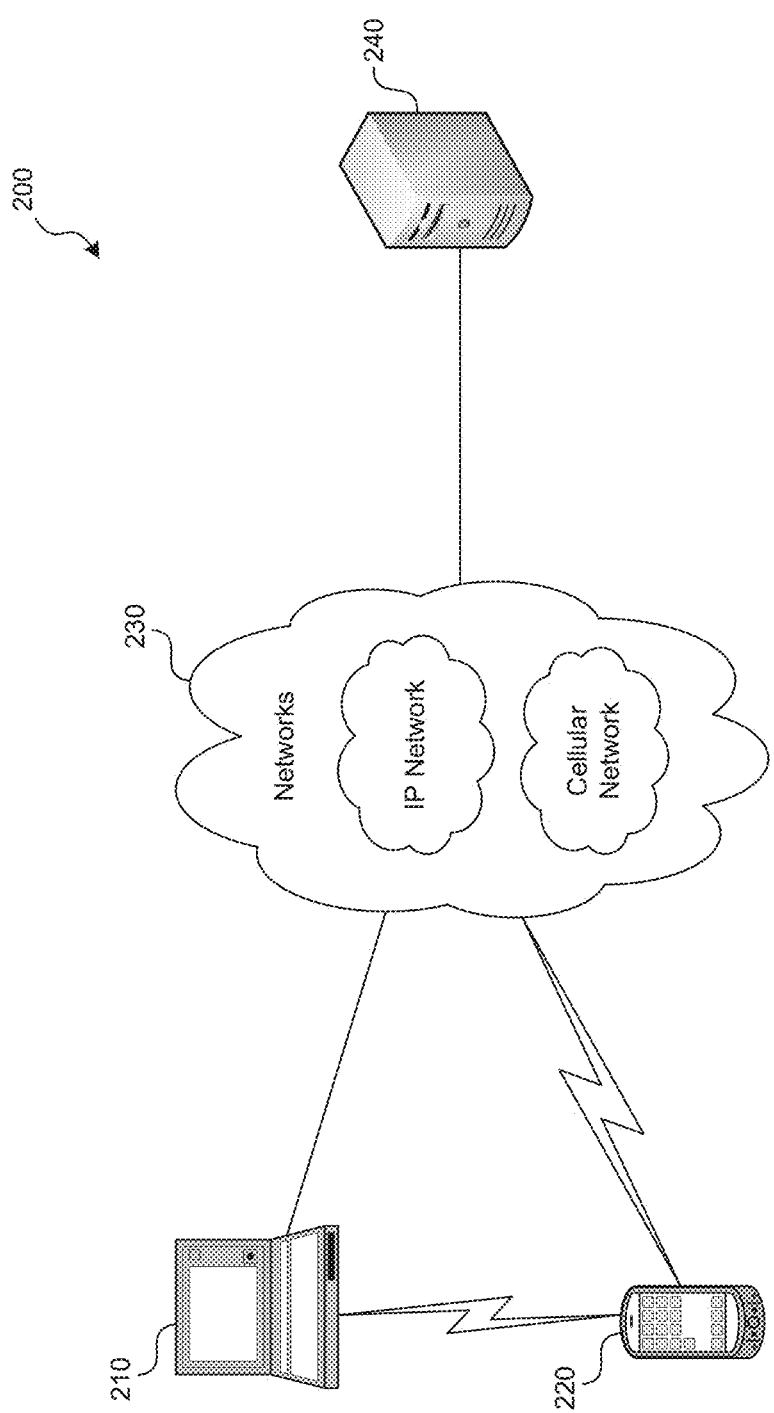
FIG. 2 is a system diagram illustrating an example of a computing environment in which an asynchronous UI framework can be utilized.

FIG. 2 is a system diagram illustrating an example of a computing environment 200 in which an asynchronous UI system can be utilized. As illustrated in FIG. 2, an asynchronous UI system can operate on various computing devices, such as a computer 210, mobile device 220 (e.g., a mobile phone, tablet computer, mobile media device, mobile gaming device, wearable computer, etc.), and other devices capable of receiving user inputs (e.g., such as a set-top box or vehicle-based computer). Each of these devices can include various input mechanisms (e.g., microphones, keypads, cameras, and/or touch screens) to receive user interactions (e.g., voice, text, gesture, and/or handwriting inputs). These computing devices can communicate through one or more wired or wireless, public or private, networks 230 (including, e.g., different networks, channels, and protocols) with each other and with a system 240 that, e.g., coordinates display element (e.g., view hierarchy) data structure information across user devices and/or performs computations regarding views. System 240 can be maintained in a cloud-based environment or other distributed server-client system. As described herein, user input (e.g., trace input via a virtual keyboard) can be communicated between devices 210 and 220 and/or to the system 240. In addition, information about the user or the user's device(s) 210 and 220 (e.g., the current and/or past location of the device(s), views displayed on each device, device characteristics, and user preferences and interests) can be communicated to the system 240. In some implementations, some or all of the system 240 is implemented in user computing devices such as devices 210 and 220.

Figure 3:
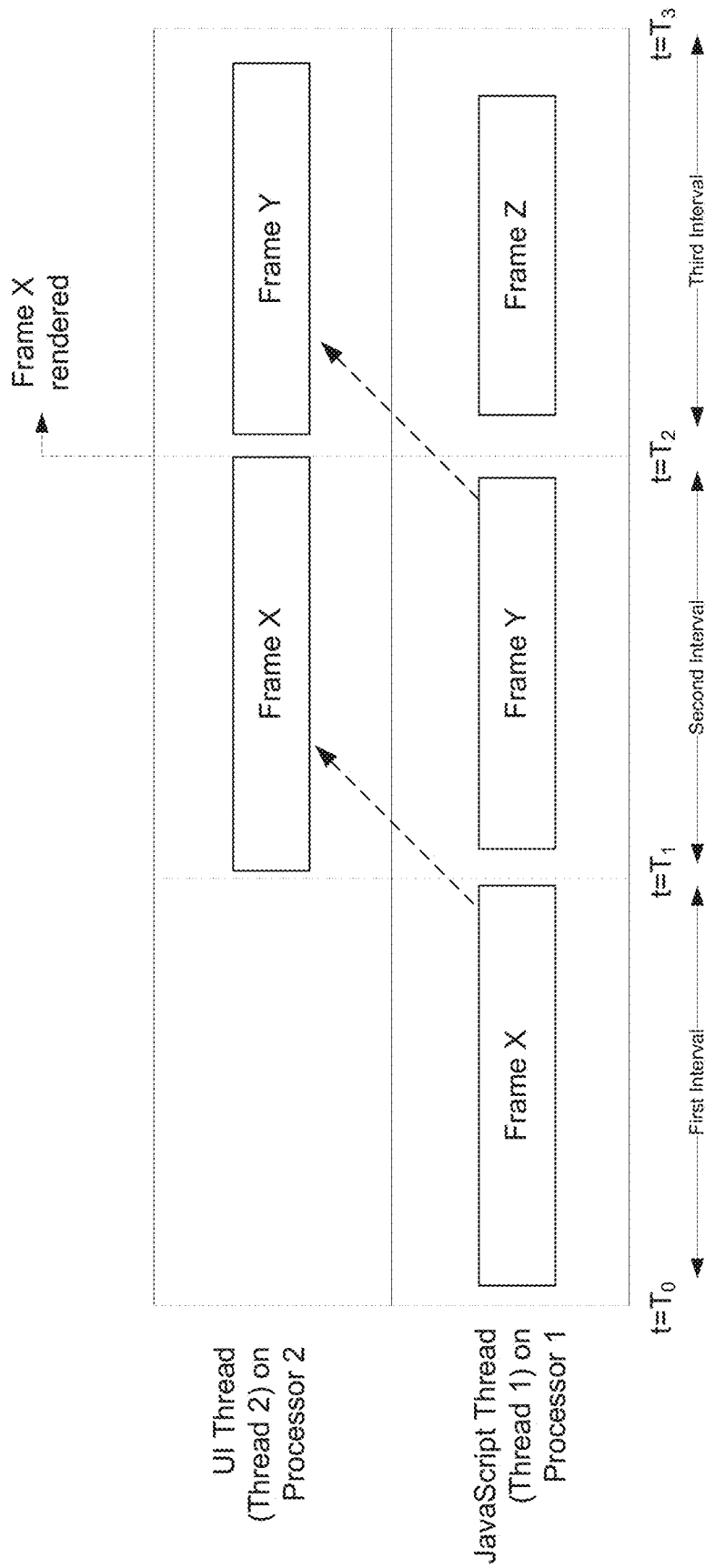
FIG. 3 is a display diagram illustrating asynchronous processing of threads in accordance with some embodiments.

FIG. 3 is a display diagram illustrating asynchronous processing of threads in accordance with some embodiments. In particular, FIG. 3 illustrates the processing of at least two threads (JavaScript thread and UI thread) on at least two processors (Processor 1 and Processor 2) over multiple intervals (e.g., first interval, second interval, and third interval) and multiple frames (e.g., Frame X, Frame Y, and Frame Z). For example, when the user touches a button, the application can determined that the touch event processing comprises executing some JavaScript code and some UI code. The application can create (or use an existing) JavaScript thread and UI thread to handle the event processing. The JavaScript thread can process the JavaScript code and the UI thread can process the UI functions. In some implementations, code that typically takes longer to execute (e.g., product logic) can be executed on the JavaScript thread instead of the UI thread to enable smooth animations and interactions. After executing the code, the JavaScript thread can communicate with the UI thread to process the drawing functions and render the result(s) on a screen. In some implementations of the invention, additional threads can be created to handle other functions (e.g., Native Modules Thread, Render Thread, etc.). In multi-core processor environments, the JavaScript thread (Thread 1) can be executed on a first processor (Processor 1) and the UI thread (Thread 2) can be executed on a second processor (Processor 2). In some implementations in a multi-core processor environment, both the JavaScript and UI threads can be executed on the same processor. In single-core processor environments, both the JavaScript and UI threads can be executed on the same processor.

The frames can be presented to the application in a specific order (e.g., Frame X followed by Frame Y and Frame Z). The JavaScript thread (Thread 1) can execute (process) over the course of Frame X beginning at time $T_0$ and ending at time $T_1$ (the First Interval). Upon processing of Frame X, the JavaScript thread can communicate with the UI thread (Thread 2) such that the UI thread can then execute (process) over the course of Frame X beginning at time $T_1$ and ending at time $T_2$ (the Second Interval). Once the UI thread completes processing, the result can be rendered to a graphical user interface coupled to the processor (e.g. first processor or second processor). While the UI thread is processing Frame X, the JavaScript thread can, in parallel, process Frame Y over the course of the Second Interval (beginning at time $T_1$ and ending at time $T_2$). The first interval, second interval, third interval, etc. can be the duration of a typical frame (e.g., 16.67 ms). In some implementations, at one of the first interval, second interval, third interval is smaller or larger than the time taken to process a frame (e.g. Frame X, Frame Y, and Frame Z, respectively). Different frames (e.g., Frame X, Frame Y, Frame Z, etc.) can be of the same length or of different lengths. In some implementations, the application can begin processing on each of the threads as soon as the next frame starts. In some implementations, instead of waiting for a time interval to finish, the application can begin processing a frame on a thread as soon as that frame's processing is complete on another thread. For example, instead of waiting until time $T_1$, the UI thread can begin execution of Frame X at an earlier time if the JavaScript thread finishes processing Frame X at a time prior to Time $T_1$. In some implementations, the application can begin processing a frame on a thread while the frame is being processed in parallel on another thread.

In this way, while the processing latency can increase by one frame, the throughput stays the same because the application is still pushing through one additional frame every time interval. This results in a pipeline parallel architecture for processing multiple frames over multiple threads (e.g. JavaScript and UI threads) on one or more processors.

Figure 4:
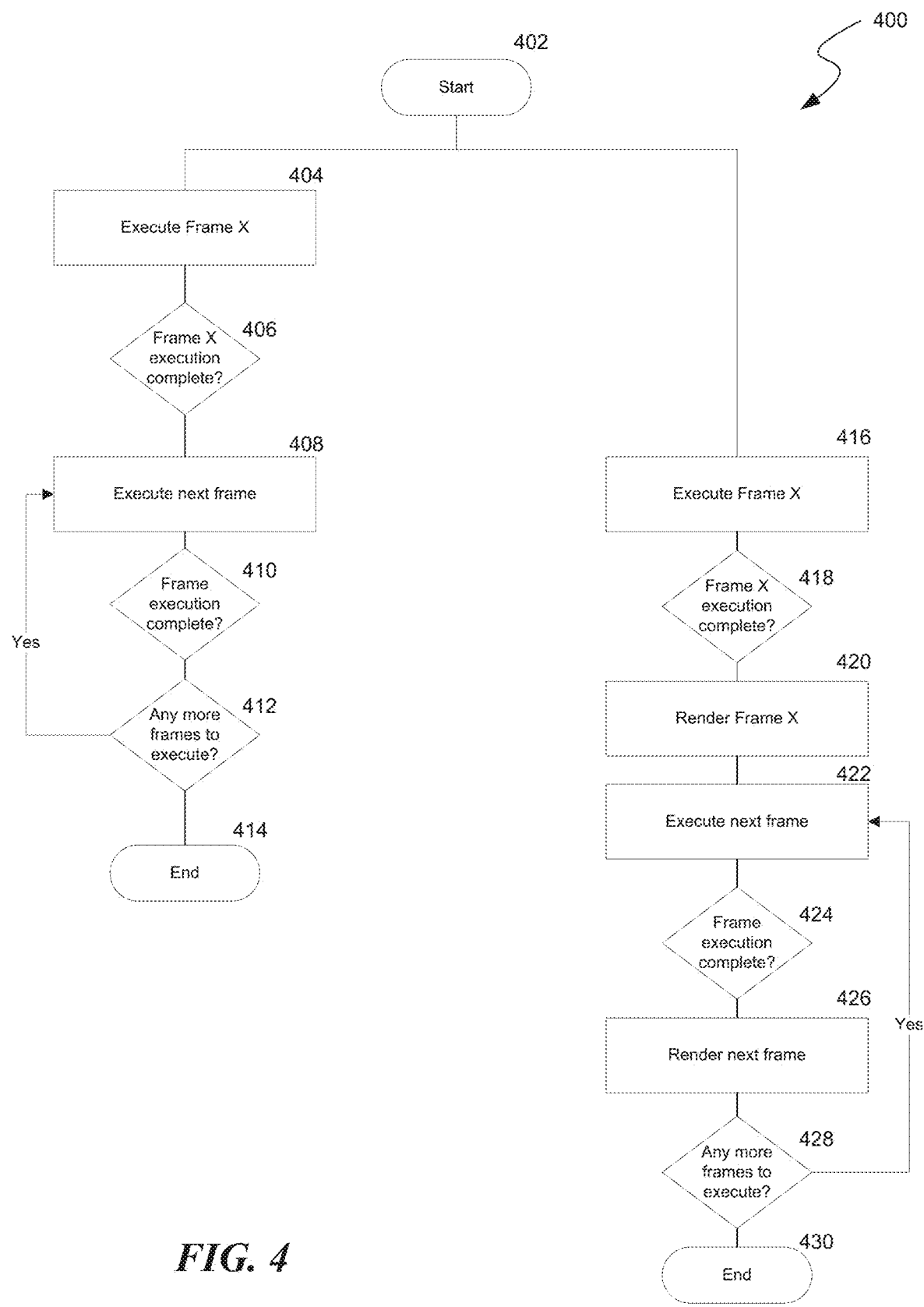
FIG. 4 is a data flow diagram illustrating a process for a computer system to asynchronously process threads in accordance with some embodiments.

FIG. 4 is a data flow diagram illustrating a process for a computer system (e.g., the computing system 100 of FIG. 1) to asynchronously process threads in accordance with some embodiments. The process begins in block 402 upon receiving a frame (Frame X) for processing and proceeds to block 404. At block 404, a first thread (e.g., a JavaScript thread) at a processor (e.g., Processor 1) in the computer system executes Frame X. At Block 406, process 400 determines if execution of the frame is complete. Once the frame execution is complete, process 400 proceeds to block 408 and begins processing the next frame (e.g., Frame Y). At block 410, the process determines if execution of the next frame (Frame Y) is complete. Once the frame execution is complete, process 400 determines, at block 412, if any other frames are pending execution. If additional frames are to be executed, process 400 loops back to block 408 until all frames are executed.

At substantially the same time as process 400 is executing block 408, at block 416, a second thread (e.g., a UI thread) at a processor (e.g., Processor 1 or Processor 2) in the computer system begins execution of the frame that was just executed by the first thread (Frame X). In some embodiments, block 416 is executed immediately following block 406. In some embodiments, there is some gap between the execution of blocks 406 and 416. For example, some housekeeping functions can be executed after process 400 executes block 406, prior to process 400 executing the blocks following block 416. At block 418, process 400 determines if execution of the frame (Frame X) is complete by the second thread. Once the frame execution is complete, process 400 proceeds to block 420 and renders the executed frame (Frame X) at a graphical user interface in the computer system. Process 400 then proceeds to block 422 where it begins processing the next frame (e.g., Frame Y) by the second thread. At block 424, process 400 determines if execution of the next frame (Frame Y) is complete by the second thread. Once the frame execution is complete, process 400 proceeds to block 426 and renders the next executed frame (Frame Y) at a graphical user interface in the computer system. Process 400 then determines, at block 428, if any other frames are pending execution by the second thread. If additional frames are to be executed, process 400 loops back to block 422 until all frames are executed by the second thread.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the implementations. Accordingly, the implementations are not limited except as by the appended claims.

Reference in this specification to "one implementation," "an implementation," or "some implementations" means that a particular feature, structure, or characteristic described in connection with the implementation is included in at least one implementation of the disclosure. The appearances of the phrase "in some implementations" in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various implementations given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Without intent to further limit the scope of the disclosure, examples of instruments, apparatus, methods and their related results according to the implementations of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A computer-readable storage medium storing instructions that, when executed by a computing system, cause the computing system to perform operations for parallel processing of a first thread and a second thread, the operations comprising:

processing a first frame on the first thread on a first processor over a first time interval, wherein the first thread is configured for event processing;

processing the first frame on the second thread on a second processor over a second time interval overlapping with the first time interval such that the second thread processes the first frame in parallel with the first thread during an overlapping portion of the first and second time intervals, wherein the second thread is configured to interface with an operating system, and wherein the first thread is configured to be implemented in parallel to the second thread over the second time interval such that the first thread processes a second frame after processing the first frame; and rendering, by the second thread, the first frame after processing the first frame is complete.

2. The computer-readable storage medium of claim 1 wherein the first thread is a JavaScript thread.

3. The computer-readable storage medium of claim 1 wherein the second thread is a User Interface thread.

4. The computer-readable storage medium of claim 1 wherein the first time interval and the second time interval are offset by a length of time.

5. The computer-readable storage medium of claim 4 wherein the length of time is time taken to process the first frame or the second frame.

6. The computer-readable storage medium of claim 5 wherein the time taken to process the first frame or the second frame is 16 milliseconds.

7. The computer-readable storage medium of claim 1 wherein the first frame is rendered to a graphical user interface coupled to the first processor or the second processor.

8. A method performed by a computing system having memory and a processor for parallel processing of a first thread and a second thread, comprising:

processing a first frame on the first thread on the processor over a first time interval, wherein the first thread is configured for event processing;

processing the first frame on the second thread on the processor over a second time interval overlapping with the first time interval such that the second thread processes the first frame in parallel with the first thread during an overlapping portion of the first and second time intervals, wherein the second thread is configured to interface with an operating system, and wherein the first thread is configured to be implemented in parallel to the second thread over the second time interval such that the first thread processes a second frame after processing the first frame; and rendering, by the second thread, the first frame after processing the first frame is complete.

9. The method of claim 8 wherein the first thread is a JavaScript thread.

10. The method of claim 8 wherein the second thread is a User Interface thread.

11. The method of claim 8 wherein the first time interval and the second time interval are offset by a length of time.

12. The method of claim 11 wherein the length of time is time taken to process the first frame or the second frame.

13. The method of claim 12 wherein the time taken to process the first frame or the second frame is 16 milliseconds.

14. The method of claim 8 wherein the first frame is rendered to a graphical user interface coupled to the processor.

15. A system for processing a first thread and a second thread in parallel, comprising:

at least one hardware processor coupled to a network; and a memory configured to store processor-executable components, wherein the processor-executable components further comprises:

a component configured to process a first frame on the first thread on the processor over a first time interval, wherein the first thread is configured for event processing; and a component configured to process the second thread on the processor over a second time interval overlapping with the first time interval, wherein:

the second thread is configured to process the first frame in parallel with the first thread during an overlapping portion of the first and second time intervals, the first thread is configured to be implemented in parallel to the second thread over the second time interval such that the first thread processes a second frame after processing the first frame, and the second thread is configured to render the first frame after processing the first frame is complete.

16. The system of claim 15 wherein the first thread is a JavaScript thread.

17. The system of claim 15 wherein the second thread is a User Interface thread.

18. The system of claim 15 wherein the first time interval and the second time interval are offset by a length of time.

19. The system of claim 18 wherein the length of time is time taken to process the first frame or the second frame.

20. The system of claim 15 further comprising:

a graphical user interface to render the first frame or the second frame.

* * * * *